US011438326B2

(12) United States Patent
Jung et al.

(10) Patent No.: US 11,438,326 B2
(45) Date of Patent: Sep. 6, 2022

(54) ELECTRONIC DEVICE, EXTERNAL ELECTRONIC DEVICE AND SYSTEM COMPRISING SAME

(71) Applicant: Samsung Electronics Co., Ltd., Suwon-si (KR)

(72) Inventors: Youngman Jung, Suwon-si (KR); Junbum Shin, Suwon-si (KR); Dongik Lee, Suwon-si (KR); Oleksandr Chalyi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 16/965,969

(22) PCT Filed: Jan. 29, 2019

(86) PCT No.: PCT/KR2019/001230
§ 371 (c)(1),
(2) Date: Jul. 29, 2020

(87) PCT Pub. No.: WO2019/147105
PCT Pub. Date: Aug. 1, 2019

(65) Prior Publication Data
US 2021/0044577 A1 Feb. 11, 2021

(30) Foreign Application Priority Data

Jan. 29, 2018 (KR) .................. 10-2018-0010511

(51) Int. Cl.
H04L 9/40 (2022.01)
H04L 9/32 (2006.01)

(52) U.S. Cl.
CPC ........ H04L 63/0823 (2013.01); H04L 9/3236 (2013.01); H04L 9/3247 (2013.01); H04L 63/061 (2013.01); H04L 63/0853 (2013.01)

(58) Field of Classification Search
CPC ............... H04L 63/0823; H04L 63/061; H04L 63/0853; H04L 9/3236; H04L 9/3247
(Continued)

(56) References Cited

U.S. PATENT DOCUMENTS 8,225,095 B2 7/2012 Funk
10,885,410 B1 * 1/2021 Rule .................... G06Q 20/322
(Continued)

FOREIGN PATENT DOCUMENTS

GB 2512502 B 10/2014
JP 2008-017403 A 1/2008
(Continued)

OTHER PUBLICATIONS

International Search Report dated May 3, 2019 in connection with International Patent Application No. PCT/KR2019/001230, 2 pages.
(Continued)

Primary Examiner — Kambiz Zand
Assistant Examiner — Mahabub S Ahmed

(57) ABSTRACT

An electronic device is disclosed. The electronic device comprises: a camera; a storage unit; and a processor for capturing an image including authentication information of an external electronic device through the camera, acquiring first information related with a public key included in the image and storing the first information in the storage unit, and comparing second information with the first information so as to authenticate the external electronic device when the second information and identification information related with the public key are received from the external electronic device on the basis of a type of first information.

15 Claims, 7 Drawing Sheets

(58) Field of Classification Search
USPC .......................................................... 713/156
See application file for complete search history.

(56) References Cited

U.S. PATENT DOCUMENTS

| | | | | |
|---|---|---|---|---|
| 11,010,754 | B2* | 5/2021 | Campero | H04L 63/102 |
| 2005/0091508 | A1* | 4/2005 | Lee | H04L 9/0838 |
| | | | | 713/182 |
| 2006/0200857 | A1* | 9/2006 | Yokota | H04L 63/0823 |
| | | | | 726/6 |
| 2011/0108622 | A1* | 5/2011 | Das | G06Q 20/3276 |
| | | | | 235/380 |
| 2012/0084571 | A1* | 4/2012 | Weis | G06F 21/34 |
| | | | | 713/184 |
| 2012/0308003 | A1* | 12/2012 | Mukherjee | H04L 9/3247 |
| | | | | 380/243 |
| 2013/0111208 | A1* | 5/2013 | Sabin | H04W 12/069 |
| | | | | 713/176 |
| 2013/0244615 | A1* | 9/2013 | Miller | H04W 12/06 |
| | | | | 455/411 |
| 2014/0108785 | A1* | 4/2014 | Lindteigen | H04L 9/3263 |
| | | | | 713/156 |
| 2014/0108810 | A1* | 4/2014 | Chenna | H04L 9/3263 |
| | | | | 713/179 |
| 2014/0351589 | A1* | 11/2014 | Chenna | H04W 12/068 |
| | | | | 713/168 |
| 2014/0359299 | A1* | 12/2014 | Jaundalders | H04L 9/3247 |
| | | | | 713/179 |
| 2015/0304309 | A1* | 10/2015 | Verma | H04L 9/321 |
| | | | | 713/156 |
| 2015/0319614 | A1* | 11/2015 | Cho | H04W 12/108 |
| | | | | 726/7 |
| 2015/0356306 | A1* | 12/2015 | Carter | G06F 21/64 |
| | | | | 380/246 |
| 2016/0189147 | A1* | 6/2016 | Vanczak | H04L 63/0838 |
| | | | | 705/71 |
| 2016/0277369 | A1* | 9/2016 | Lee | H04L 9/30 |
| 2016/0330179 | A1 | 11/2016 | Choi et al. | |
| 2017/0099137 | A1* | 4/2017 | Pang | H04L 9/0825 |
| 2017/0238164 | A1* | 8/2017 | Pang | H04W 12/06 |
| | | | | 455/41.3 |
| 2018/0227293 | A1* | 8/2018 | Uhr | H04L 9/0637 |
| 2018/0241570 | A1* | 8/2018 | Pang | H04W 12/062 |
| 2019/0245684 | A1* | 8/2019 | Shen | G06K 19/10 |
| 2020/0322172 | A1* | 10/2020 | Guo | H04L 9/083 |

FOREIGN PATENT DOCUMENTS

| | | |
|---|---|---|
| KR | 10-2009-0122657 A | 12/2009 |
| KR | 10-1113446 B1 | 2/2012 |
| KR | 10-2012-0084005 A | 7/2012 |
| KR | 10-2013-0054047 A | 5/2013 |
| KR | 10-1281574 B1 | 7/2013 |
| KR | 10-2016-0099333 A | 8/2016 |

OTHER PUBLICATIONS

Written Opinion of the International Searching Authority dated May 3, 2019 in connection with International Patent Application No. PCT/KR2019/001230, 4 pages.

* cited by examiner

ELECTRONIC DEVICE, EXTERNAL ELECTRONIC DEVICE AND SYSTEM COMPRISING SAME

CROSS-REFERENCE TO RELATED APPLICATIONS

This application is a 371 of International Application No. PCT/KR2019/001230 filed on Jan. 29, 2019, which claims priority to Korean Patent Application No. 10-2018-0010511 filed on Jan. 29, 2018, the disclosures of which are herein incorporated by reference in their entirety.

BACKGROUND

1. Field

The disclosure relates to an electronic device, an external electronic device, a system including the same, and a method for controlling the same, and more particularly relates to an electronic device which executes authentication for an external electronic device and a method for controlling the same.

2. Description of Related Art

An authentication process is performed in advance for communication between electronic devices. Examples of a method for executing the authentication process generally include a public key infrastructure (PKI) method using an encryption system based on a public key, a PIN code method for inputting matching password, and the like.

In the PKI method, an electronic device is issued a public key, a private key, and a digital signature generated by a certificate authority and transmits a certificate including the public key and the digital signature to another electronic device. Such a PKI method caused a burden to the electronic device due to a complicated system.

The PIN code method had an inconvenience for a user in directly inputting a PIN code due to a long length thereof and was weak in brute-force-attack for attempting all possible numbers.

The disclosure is made in view of the above needs and an object of the disclosure is to provide an electronic device which executes simplified authentication via a QR code including authentication information generated by an external electronic device, an external electronic device, a system including the same, and a method for controlling the same.

SUMMARY

According to an embodiment of the disclosure for achieving the above-mentioned object, there is provided an electronic device including a camera, a storage, and a processor configured to capture an image including authentication information of an external electronic device using the camera, obtain first information related to a public key included in the image, and store the first information in the storage, and based on second information related to the public key and identification information being received from the external electronic device based on a type of the first information, execute authentication for the external electronic device by comparing the second information with the first information.

The image including the authentication information may include a QR code.

The type of the first information may be at least one of a public key, a hash value related to the public key, a certificate including the public key.

The processor may be configured to request the external electronic device for the second information which is the same type as the type of the first information based on the identification information. The processor may be configured to, based on the type of the first information being the hash value and the first information matching with the second information, transmit a public key request signal to the external electronic device based on the identification information.

The processor may be configured to, based on the public key being received from the external electronic device, compare the first information with third information output by inputting the received public key to a hash function, and based on the third information matching with the first information, execute authentication for the external electronic device.

The identification information may include a digital signature.

The processor may be configured to, based on the third information matching with the first information, identify whether or not the digital signature is created based on a private key corresponding to the public key received from the external electronic device, and based on the digital signature being identified as a digital signature created based on the private key, finish the authentication.

The processor may be configured to, based on the type of the first information being the public key and the first information matching with the second information, transmit a certificate request signal to the external electronic device based on the identification information.

The processor may be configured to, based on the certificate being received from the external electronic device, compare the received certificate with a certificate obtained based on the public key received from the image, and based on the received certificate matching with the obtained certificate, finish the authentication.

The processor may be configured to, based on the type of the first information being the certificate and the first information matching with the second information, transmit a certificate request signal to the external electronic device based on the identification information.

The processor may be configured to, based on the certificate being received from the external electronic device, compare the received certificate with a certificate obtained from the image, and based on the received certificate matching with the obtained certificate, finish the authentication.

According to another embodiment of the disclosure, there is provided an electronic system including a first electronic device configured to obtain a QR code including a hash value output by inputting a public key to a hash function and provide the QR code, and a second electronic device configured to capture the QR code of the first electronic device, obtain and store a first hash value of the public key included in the QR code, based on a second hash value of the public key and identification information being received from the first electronic device, execute authentication for the first electronic device by comparing the second hash value with the first hash value.

The second electronic device may, based on the first hash value matching with the second hash value, transmit a signal requesting for the public key of the first electronic device to the first electronic device based on the identification information.

The first electronic device may, based on the signal being received, transmit the public key of the first electronic device to the second electronic device.

The second electronic device may, based on the public key being received from the first electronic device, compare the first hash value with a third hash value output by inputting the received public key to the hash function, and based on the third hash value matching with the first hash value, execute authentication for the first electronic device.

The identification information may include a digital signature.

The second electronic device may, based on the third hash value matching with the first hash value, identify whether or not the digital signature is created based on a private key corresponding to the public key received from the first electronic device, and based on the digital signature being identified as a digital signature created based on the private key, finish the authentication.

According to still another embodiment of the disclosure, there is provided a method for controlling an electronic device, the method including capturing an image including authentication information of an external electronic device, obtaining first information related to a public key included in the image, and storing the first information, and based on second information related to the public key and identification information being received from the external electronic device based on a type of the first information, executing authentication for the external electronic device by comparing the second information with the first information.

The image including the authentication information may include a QR code.

The type of the first information may be at least one of a public key, a hash value related to the public key, a certificate including the public key.

The method may further include requesting the external electronic device for the second information which is the same type as the type of the first information.

The executing authentication may include, based on the type of the first information being the hash value and the first information matching with the second information, transmitting a public key request signal to the external electronic device based on the identification information.

The executing authentication may include, based on the public key being received from the external electronic device, comparing the first information with third information output by inputting the received public key to a hash function, and based on the third information matching with the first information, executing authentication for the external electronic device.

The identification information may include a QR code.

The executing authentication may include, based on the third information matching with the first information, identifying whether or not the digital signature is created based on a private key corresponding to the public key received from the external electronic device, and based on the digital signature being identified as a digital signature created based on the private key, finishing the authentication.

As described above, according to the embodiments of the disclosure, the authentication process is simplified to enhance convenience of a user, since the authentication process for the external electronic device is executed only by an operation of capturing the QR code.

In addition, a high level of security is ensured since the authentication information for the external electronic device visually confirmed by a user is received.

DETAILED DESCRIPTION

Figure 1:
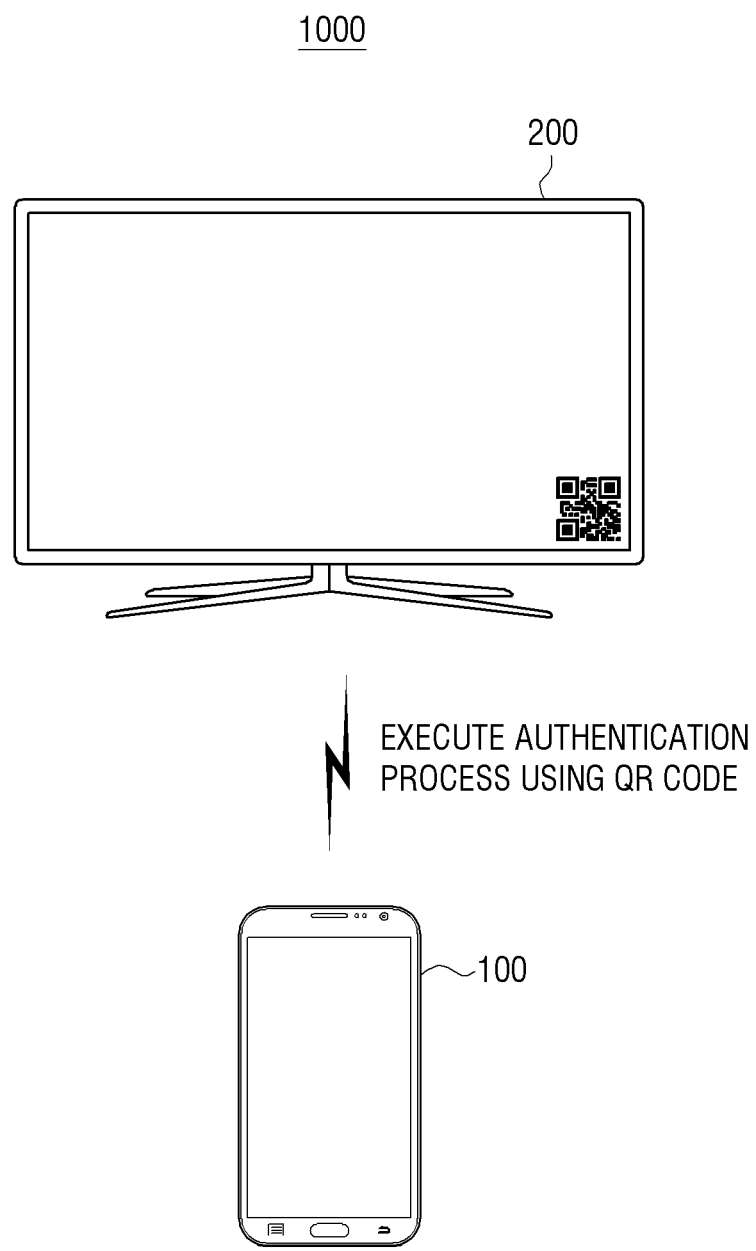
FIG. 1 is a schematic view for explaining a system including an electronic device and an external electronic device according to an embodiment.

The disclosure will be described in detail after briefly explaining the terms used in the specification.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there is also a term arbitrarily selected by the applicant, in which case the meaning will be described in detail in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist" of are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not shown).

Hereinafter, with reference to the accompanying drawings, embodiments of the disclosure will be described in detail so that those skilled in the art can easily make and use the embodiments in the technical field of the disclosure. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

In addition, expression such as "at least one of a, b, and c" may be understood as "a", "b", "c", "a and b", "a and c", "b and c", or "a, b, and c".

Hereinafter, the disclosure will be described in detail with reference to the accompanying drawings.

FIG. 1 is a schematic view for explaining a system including an electronic device and an external electronic device according to an embodiment of the disclosure.

An electronic device 100 has a function of executing communication with an external electronic device 200. The electronic device 100 may be implemented as, for example, a smartphone. But, there is no limitation and any device capable of capturing an image including authentication information (e.g., QR code) through a camera provided in the electronic device 100 and recognizing it can be used. For example, the electronic device 100 may be implemented as a tablet, a laptop computer, a camera, a PC, and the like. The QR code herein means a code with a square grid including various pieces of data. The QR code, as a two-dimensional code, may contain a larger amount of data than a barcode which is a one-dimensional code.

The external electronic device 200 has a function of generating an image including authentication information (e.g., QR code). The external electronic device 200 may be implemented as, for example, various types of home appliances such as a TV, a PC, a washing machine, a refrigerator, and an air conditioner, and various medical devices. But, there is no limitation and any device capable of generating the image including authentication information (e.g., QR code) may be used.

In FIG. 1, the electronic device 100 is illustrated as a smartphone and the external electronic device 200 is illustrated as a TV, but this is merely an example, and there is no limitation thereto.

The encryption method includes a symmetric cryptosystem that uses the same key when encrypting data and decrypting data, and asymmetric cryptosystem that uses different keys when encrypting data and decrypting data. A public key described hereinafter means a key used in the asymmetric cryptosystem.

In the public key method, two different keys, which are a public key and a private key capable of decrypting data encrypted by the public key, are needed.

The PKI method which is an encryption method using a public key in the related art caused a burden to an electronic device due to a complicated authentication system such as issuance of a certificate from the certificate authority.

According to embodiments of the disclosure, the electronic device 100 executes such an authentication process by capturing the QR code so that the external electronic device 200 may transfer a public key by simply executing the authentication process without any complicated process such as transmission of a certificate issued by the certificate authority (CA) to the electronic device 100. In addition, reliability with respect to security may also increase since the authentication information included in the QR code which is captured by a user is used. Hereinafter, various embodiments of the disclosure will be described in detail with reference to the drawings.

Figure 2:
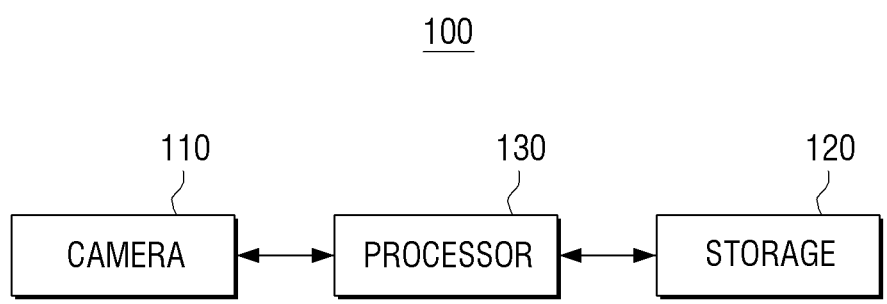
FIG. 2 is a block diagram illustrating a configuration of the electronic device according to an embodiment.

FIG. 2 is a block diagram illustrating a configuration of the electronic device according to an embodiment.

Referring to FIG. 2, the electronic device 100 includes a camera 110, a storage 120, and a processor 130.

The camera 110 may capture a still image or a video. The captured image herein may be a QR code including authentication information. However, there is no limitation thereto, and the captured image may correspond to various types of images including authentication information. For example, the image captured by the camera 110 may be a barcode which is a one-dimensional code including authentication information.

The authentication information may be a public key of the external electronic device 200, a certificate including the public key, or a hash value of the public key. However, there is no limitation, as long as it is information related to the authentication for the external electronic device 200.

The storage 120 may store a control program for controlling the electronic device 100 and the processor 130, an application which is initially provided from a manufacturer or downloaded from outside, a graphical user interface (hereinafter, referred to as a "GUI") related to the application, objects (e.g., image, text, icon, button, and the like) for providing the GUI, user information, documents, databases, related data, and the like.

In particular, the storage 120 may store the authentication information included in the QR code captured by the camera 110. In addition, the storage 120 may store a hash function for authenticating the public key obtained from the external electronic device 200. The hash function herein may be stored in the storage 120 in advance or included in the QR code and then stored in the storage 120, but there is no limitation thereto.

The storage 120 may be implemented as an internal memory such as a ROM, a RAM, or the like included in the processor 130 or may be implemented as a memory separated from the processor 130. In such a case, the storage 120 may be implemented in a form of a memory embedded in the electronic device 100 or implemented in a form of a memory detachable from the electronic device 100 according to data storage purpose. For example, data for operating the electronic device 100 may be stored in a memory embedded in the electronic device 100, and data for an extended function of the electronic device 100 may be stored in a memory detachable from the electronic device 100. The memory embedded in the electronic device 100 may be implemented in a form of a non-volatile memory, a volatile memory, a hard disk drive (HDD), or a solid state drive (SSD).

The processor 130 controls general operations of the electronic device 100.

According to an embodiment, the processor 130 may be implemented as a digital signal processor (DSP), a microprocessor, or a time controller (TCON) processing digital signals. However, there is no limitation thereto, and the processor 130 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 130 may be implemented as System on Chip (SoC) or large scale integration (LSI) including the processing algorithm or may be implemented in form of a Field Programmable gate array (FPGA).

According to an embodiment of the disclosure, an image including authentication information of the external electronic device 200 is captured by the camera 110, and the processor 130 may obtain first information related to a public key included in the image including the authentication information. The processor 130 may store the first information in the storage 120. The image including the authentication information may include the QR code.

The type of the first information may be at least one of a public key, a hash value related to the public key, and a certificate including the public key, and the processor 130 may request the external electronic device 200 for second information which is the same type as the type of the first information based on identification information. For example, when obtaining the hash value related to the public key as the first information from the image including the authentication information, the processor 130 may request the external electronic device 200 for the hash value.

The public key means an arbitrary a character string and may be generated by the external electronic device 200. However, the public key may be generated by another device and transmitted to the external electronic device 200.

The hash value means a value output by inputting the public key of the external electronic device 200 corresponding to an input value to the hash function. The hash value output using the hash function may have a smaller bit number than the input value. Accordingly, the volume of the authentication information stored in the storage 120 is small when the hash value is included in the QR code, compared to a case where the public key corresponding to the input value is included in the QR code, and as the volume of the authentication information is small, the processor 130 may take a shorter period of time to compare this authentication information with other authentication information. Thus, when the hash value is included in the QR code, the processor 130 may take a shorter period of time to compare this with another hash value, compared to a case where the public key is included in the QR code.

When the first information is stored in the storage 120, the processor 130 may transmit a signal requesting for second information to the external electronic device 200.

When the second information and identification information are received from the external electronic device 200, the processor 130 may execute authentication for the external electronic device 200 by comparing the second information with the first information.

The identification information herein may be identification information related to the external electronic device 200 and may include a digital signature. The digital signature will be described later in detail.

The processor 130 may receive the second information and the identification information from the external electronic device 200 by a predetermined communication method with a predetermined protocol.

The predetermined protocol may be SSL or TLS protocol but there is no limitation thereto. The predetermined communication method may be a communication method such as Bluetooth (BT), Wireless Fidelity (Wi-Fi), Zigbee, or Infrared (IR), but there is no limitation thereto.

The first information is a value obtained by capturing the QR code provided by the external electronic device 200 and may be information having a relatively higher reliability with respect to security than a value obtained using a communication channel such as BT. Accordingly, the first information may be a reference for executing the authentication for the external electronic device 200. Thus, the processor 130 may execute the authentication for the external electronic device 200 by comparing the second information obtained via the communication channel with the first information.

According to an embodiment of the disclosure, if the type of the first information is a hash value and the first information matches with the second information, the processor 130 may transmit a public key request signal to the external electronic device 200 based on the identification information.

The hash value means a value output by inputting the public key of the external electronic device 200 corresponding to the input value to the hash function. With the hash function, when an input value having an arbitrary bit number is input, a hash value having a fixed bit number is output and the input value may not be restored with the output hash value. When using the hash function, the same hash value may be output with respect to the same input. Accordingly, when the number of hash values is more than one and the hash values match with each other, the input values input to the hash function may be determined as same values.

The second information matching with the first information means that the public key which is an input value corresponding to the second information is the same as the public key corresponding to the first information. That is, the external electronic device 200 which has transmitted the second information via the communication channel may be determined as the same device as the external electronic device 200 which has provided the QR code including the hash value, and accordingly, this may be the authentication for the external electronic device 200. Then, the processor 130 may transmit a signal requesting for the public key corresponding to the input value of the hash value to the external electronic device 200.

When the public key is received from the external electronic device 200, the processor 130 may compare third information which is the output hash value with the first information by inputting the received public key to the hash function.

When the third information matches with the first information, the processor 130 may execute the authentication for the external electronic device 200.

The processor 130 may input the received public key to the hash function in order to identify whether or not the received public key is the public key provided by the external electronic device 200. Since the hash function outputs the same hash value with respect to the same input value, the third information and the first information, which are hash values, matching with each other means that the external electronic device 200 which has transmitted the public key via the communication channel is the same device as the external electronic device 200 which has provided the QR code including the hash value. Thus, the third information matching with the first information may be the authentication for the external electronic device 200.

When the third information matches with the first information, the processor 130 may identify whether or not the digital signature is created based on a private key corresponding to the public key received from the external electronic device 200.

The digital signature herein means a signature created using a private key. Such a digital signature may ensure the identity of the subject which has provided the public key. In general, a key for encrypting data is the public key and a key for decrypting the encrypted data is a private key, but the digital signature may encrypt data indicating the subject using the private key and may be decrypted using the public key. The digital signature is not for protecting private information, but is for indicating the subject which has provided the public key, and accordingly, the digital signature may be decrypted using the public key exposed to others. The digital signature that is able to be decrypted using the public key may be generated only by the subject having the private key, and thus, this may ensure the identity of the subject which has provided the public key.

The external electronic device 200 may transmit the digital signature obtained by encrypting information using the private key corresponding to the public key transmitted to the electronic device 100, to the electronic device 100. Such a digital signature may be decrypted with the public key corresponding to the private key. That is, the digital signature capable of being decrypted using the public key received from the external electronic device 200 means that such a digital signature is ensured as a digital signature created using the private key of the external electronic device 200. Accordingly, the subject which has provided the public key is ensured as the external electronic device 200 and this may be the authentication for the external electronic device 200.

When the digital signature is identified as a digital signature created based on the private key, the processor 130 may finish the authentication.

As described above, when the digital signature is decrypted using the public key received from the external electronic device 200, the external electronic device 200 is identified as a device which has created the digital signature based on the private key corresponding to the public key transmitted to the electronic device 100, and the subject which has provided the public key is ensured as the external electronic device 200. The processor 130 may determine that the entire authentication process for the external electronic device 200 has completed and may finish the authentication.

According to another embodiment of the disclosure, if the type of the first information is a certificate and the first information matches with the second information, the processor 130 may transmit a certificate request signal to the external electronic device 200 based on the identification information.

When a certificate is received from the external electronic device 200, the processor 130 may compare the received certificate with a certificate obtained from the image including the authentication information and finish the authentication, when the received certificate matches with the obtained certificate.

A certificate corresponding to the first information and a certificate corresponding to the second information may include the public key and the digital signature of the external electronic device 200.

The certificate corresponding to the first information is obtained by capturing the QR code provided by the external electronic device 200 and may be information having relatively higher reliability with respect to the security than information obtained via the communication channel such as BT. Accordingly, the certificate corresponding to the first information may be information as a reference for executing the authentication for the external electronic device 200.

According to still another embodiment of the disclosure, if the type of the first information is the public key and the first information matches with the second information, the processor 130 may transmit a certificate request signal to the external electronic device 200 based on the identification information.

When the certificate is received from the external electronic device 200, the processor 130 may compare the received certificate with a certificate obtained based on the public key received from the image including the authentication information and finish the authentication, when the received certificate matches with the obtained certificate.

The public key herein means an arbitrary character string and may be generated by the external electronic device 200. However, the public key may be generated by another device and transmitted to the external electronic device 200.

Hereinafter, the description will be made assuming the type of the first information as the hash value. Therefore, the first information, the second information, and the third information are referred to as a first hash value, a second hash value, and a third hash value, respectively.

Figure 3:
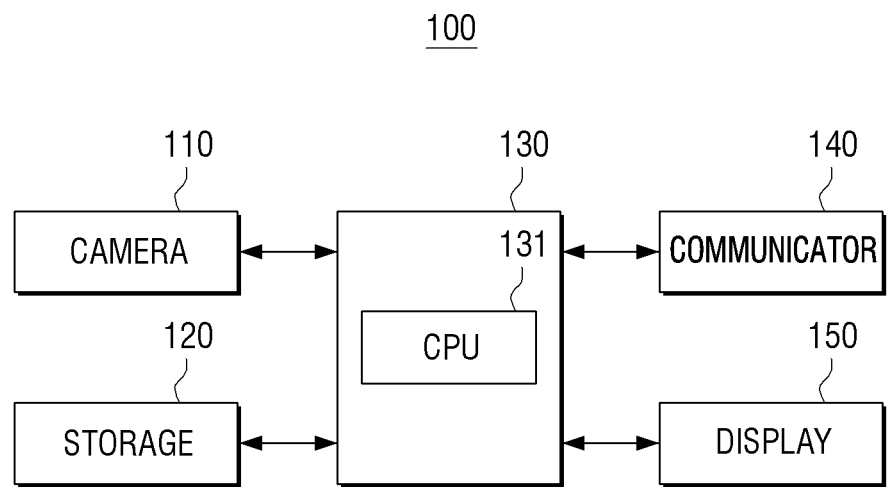
FIG. 3 is a block diagram illustrating an example of a specific configuration of the electronic device of FIG. 2.

FIG. 3 is a block diagram illustrating an example of a specific configuration of the electronic device of FIG. 2.

Referring to FIG. 3, the electronic device 100 includes the camera 110, the storage 120, the processor 130, a communicator 140, and a display 150. The detailed description will be omitted regarding components illustrated in FIG. 3 overlapped with the components illustrated in FIG. 2.

The processor 130 may include, a CPU 131, a ROM (or non-volatile memory) storing a control program for controlling the electronic device 100 and a RAM (or volatile memory) storing data input from the outside of the electronic device 100 or used as a storage area corresponding to various operations executed by the electronic device 100.

When a predetermined event occurs, the processor 130 may execute the operating system (OS), programs, and various applications stored in the storage 120. The processor 130 may be a single-core processor, a dual-core processor, a triple-core processor, a quad-core processor, or other multi-core processors.

The CPU 131 may execute the booting by using the O/S stored in the storage 120 by accessing the storage 120. The CPU 131 may execute various operations by using various programs, contents, data, and the like stored in the storage 120.

The communicator 140 may obtain the QR code provided by the external electronic device 200 using the camera 110 and may execute communication with the external electronic device 200 via predefined communication channel and communication method. The predefined communication channel may be SSL or TLS protocol, but there is no limitation thereto. In addition, the predefined communication method may be Bluetooth (BT), Wireless Fidelity (Wi-Fi), Zigbee, or Infrared (IR).

For example, when a predetermined event occurs, the communicator 140 may execute communication to be associated with the external electronic device 200 according to the predefined communication protocol and the predefined communication method. The association herein may mean any state where the communication is able to be performed between the electronic device 100 and the external electronic device 200, such as an operation of initializing the communication, an operation of networking, or an operation of executing device pairing. For example, when device identification information of the external electronic device 200 is provided to the electronic device 100 and the authentication process described above is completed, a pairing process between the two devices may be executed. For example, when a predetermined event occurs in the electronic device 100 or the external electronic device 200, the device may search for a neighboring device by Digital Living Network Alliance (DLNA) or other communication technologies to execute pairing and be associated with the searched device.

The display 150 may provide a UI for controlling the external electronic device 200.

For example, if the external electronic device 200 is implemented as a TV, when an authentication process for the TV is finished, virtual buttons for channels, volumes, external inputs, and the like for controlling the TV may be provided through the display 150.

The display 150 may be implemented in various forms of a liquid crystal display (LCD), an organic light-emitting diode (OLED), Liquid Crystal on Silicon (LCoS), digital light processing (DLP), quantum dot (QD) display panel, and the like.

Figure 4:
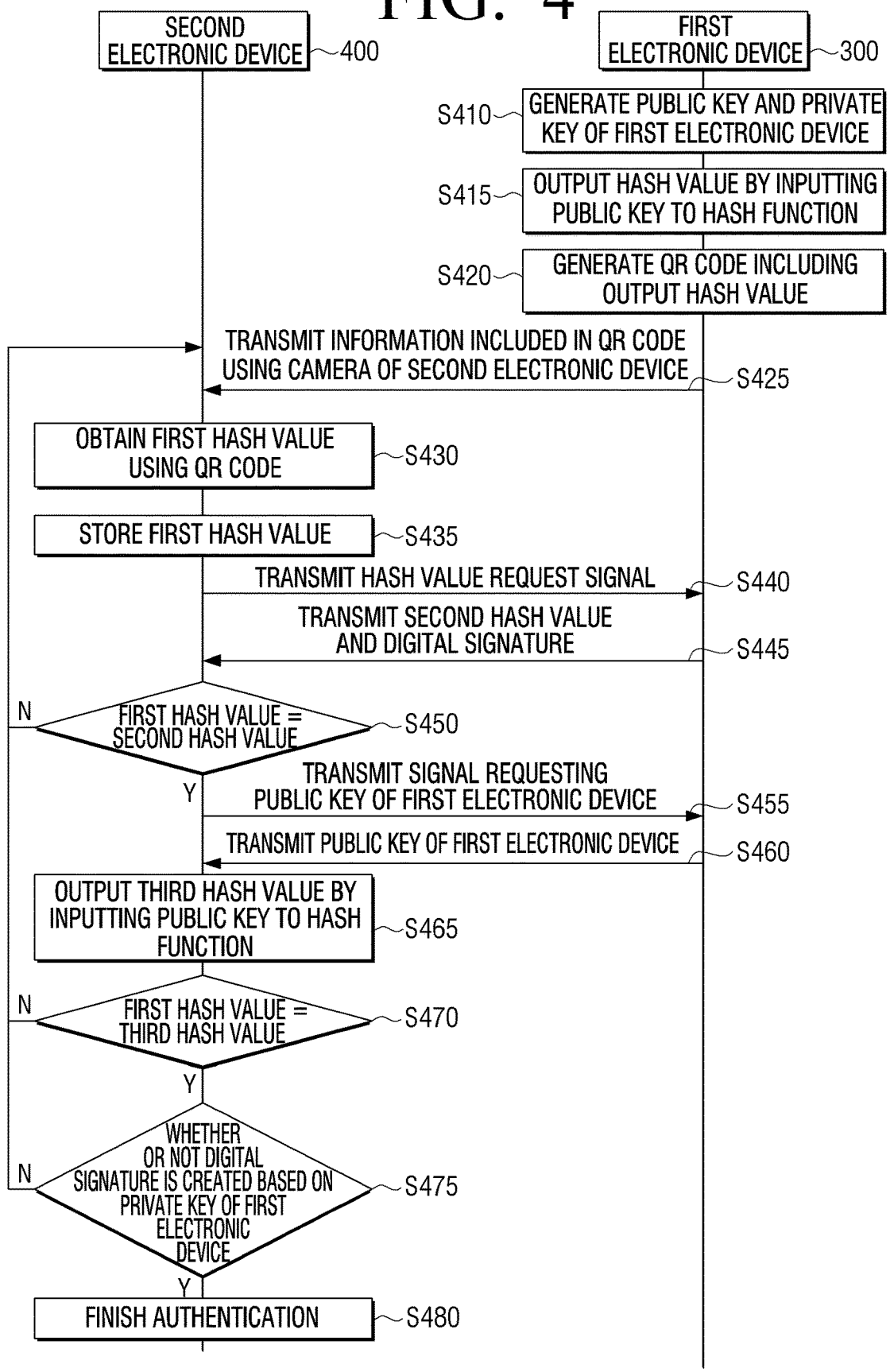
FIG. 4 is a sequence diagram for explaining an operation of executing the authentication process using a hash value according to an embodiment.

FIG. 4 is a sequence diagram for explaining an operation of executing the authentication process using the hash value according to an embodiment of the disclosure.

Referring to FIG. 4, a first electronic device 300 may generate a public key and a private key (S410). The first electronic device 300 may input the generated public key to a hash function (S415) and generate a QR code including an output hash value (S420).

The first electronic device 300 may generate the public key and the private key by itself, but may also use a public key and a private key generated from outside.

The first electronic device 300 may provide the generated QR code via a display.

The display herein may be implemented in various forms of a liquid crystal display (LCD), an organic light-emitting diode (OLED), Liquid Crystal on Silicon (LCoS), digital light processing (DLP), quantum dot (QD) display panel, and the like.

A second electronic device 400 may obtain information included in the QR code by capturing the QR code provided by the first electronic device 300 using the camera (S425). The second electronic device 400 may obtain a first hash value by analyzing the obtained QR code (S430).

The first hash value is a value obtained by capturing the QR code provided by the first electronic device 300 and may be information having relatively higher reliability with respect to security than a value obtained using a communication channel such as BT.

The second electronic device 400 may store the first hash value (S435). The first hash value may be used as information as a reference for executing the authentication for the first electronic device 300.

The second electronic device 400 may transmit a signal requesting for a second hash value to the first electronic device 300 (S440). When the signal requesting for the second hash value is received, the first electronic device 300 may transmit the second hash value and a digital signature to the second electronic device 400 by a predetermined communication method with a predetermined protocol (S445).

The predetermined protocol may be SSL or TLS protocol but there is no limitation thereto. The predetermined communication method may be a communication method such as Bluetooth (BT), Wireless Fidelity (Wi-Fi), Zigbee, or Infrared (IR), but there is no limitation thereto.

When the second hash value is received, the second electronic device 400 may compare the first hash value with the second hash value. When the first hash value matches with the second hash value (S450-Y), the second electronic device 400 may transmit a signal requesting for the public key of the first electronic device 300 to the first electronic device 300 (S455).

Since the first hash value is information having high reliability with respect to security, the second hash value matching with the first hash value means that the public key which is an input value corresponding to the second hash value is the same as the public key corresponding to the first hash value. That is, the first electronic device 300 which has transmitted the second hash value via the communication channel may be determined as the same device as the first electronic device 300 which has provided the QR code including the hash value, and accordingly, this may be the authentication for the first electronic device 300.

When the signal requesting for the public key is received, the first electronic device 300 may transmit the public key of the first electronic device 300 to the second electronic device 400 (S460).

When the public key is received from the first electronic device 300, the second electronic device 400 may input public key to the hash function to identify whether or not the received public key is the public key provided by the first electronic device 300 (S465). A value output herein is referred to as a third hash value.

The second electronic device 400 may compare the first hash value with the third hash value. Since the hash function outputs the same hash value with respect to the same input value, the third hash value matching with the first hash value means that the first electronic device 300 which has transmitted the public key via the communication channel is the same device as the first electronic device 300 which has provided the QR code including the hash value. Thus, the third hash value matching with the first hash value may be the authentication for the first electronic device 300.

When the first hash value matches with the third hash value (S470-Y), the second electronic device 400 may identify whether or not the digital signature is created based on the private key corresponding to the public key received from the first electronic device 300.

The digital signature herein means a signature created using the private key. Such a digital signature may ensure the identity of the subject which has provided the public key.

The first electronic device 300 may transmit the digital signature obtained by encrypting information using the private key corresponding to the public key transmitted to the second electronic device 400, to the second electronic device 400. Such a digital signature may be decrypted with the public key corresponding to the private key. That is, the digital signature capable of being decrypted using the public key received from the first electronic device 300 means that such a digital signature is ensured as a digital signature created using the private key of the first electronic device 300. Accordingly, the subject which has provided the public key is ensured as the first electronic device 300 and this may be the authentication for the first electronic device 300.

When the digital signature is identified as a digital signature created based on the private key of the first electronic device 300, the second electronic device 400 may finish the authentication (S475-Y).

When the digital signature is decrypted using the public key received from the first electronic device 300, the first electronic device 300 is identified as a device which has created the digital signature based on the private key corresponding to the public key transmitted to the second electronic device 400, and the subject which has provided the public key is ensured as the first electronic device 300. The second electronic device 400 may determine that the entire authentication process for the first electronic device 300 has completed and may finish the authentication (S480).

Figure 5:
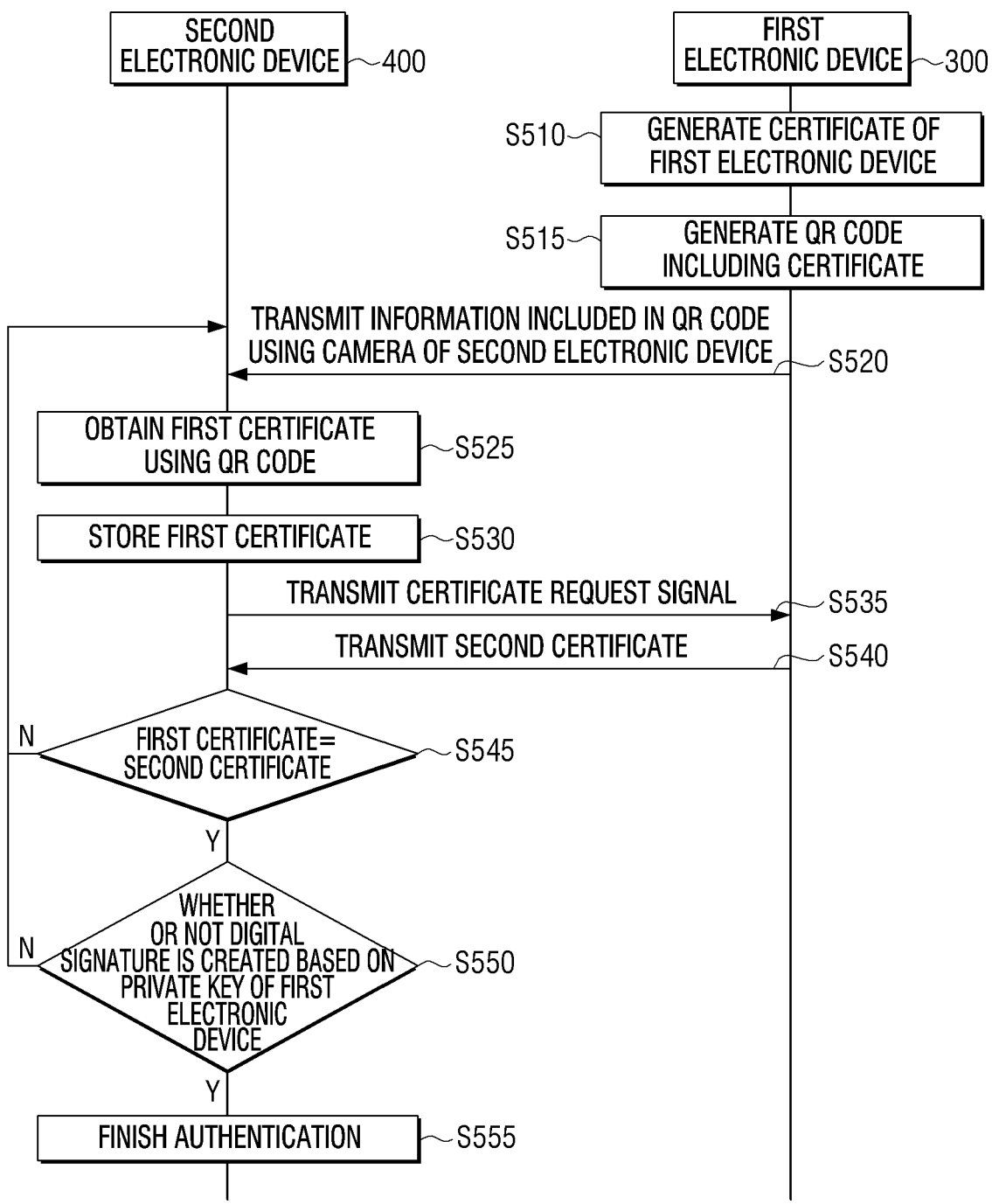
FIG. 5 is a sequence diagram for explaining an operation of executing the authentication process using a certificate according to an embodiment.

FIG. 5 is a sequence diagram for explaining an operation of executing the authentication process using a certificate according to an embodiment of the disclosure.

Referring to FIG. 5, the first electronic device 300 may generate a certificate to be used in the authentication process (S510). The first electronic device 300 may generate a QR code including the certificate (S515).

The first electronic device 300 may generate the certificate by itself, but may also use a certificate generated outside.

The second electronic device 400 may obtain information included in the QR code by capturing the QR code provided by the first electronic device 300 using the camera (S520). The second electronic device 400 may obtain a first certificate by analyzing the QR code (S525).

The first certificate is obtained by capturing the QR code provided by the first electronic device 300 and may be information having relatively higher reliability with respect to security than a value obtained using a communication channel such as BT.

The second electronic device 400 may store the first certificate (S530). The first certificate may be used as information as a reference for executing the authentication for the first electronic device 300.

The second electronic device 400 may transmit a signal requesting for a second certificate to the first electronic device 300 (S535). When the signal requesting for the second certificate is received, the first electronic device 300 may transmit the second certificate to the second electronic device 400 (S540).

When the second certificate is received by a predetermined communication method with a predetermined protocol, the second electronic device 400 may compare the first certificate with the second certificate.

The predetermined protocol may be SSL or TLS protocol but there is no limitation thereto. The predetermined communication method may be a communication method such as Bluetooth (BT), Wireless Fidelity (Wi-Fi), Zigbee, or Infrared (IR), but there is no limitation thereto.

The first certificate and the second certificate may include the public key and the digital signature of the first electronic device 300.

When the public key of the first certificate matches with the public key of the second certificate (S545-Y), the second electronic device 400 may identify whether or not the digital signature is created based on the private key corresponding to the public key received from the first electronic device 300.

When the digital signature is identified as a digital signature created based on the private key of the first electronic device 300, the second electronic device 400 may finish the authentication (S550-Y).

When the digital signature is decrypted using the public key received from the first electronic device 300, the first electronic device 300 is identified as a device which has created the digital signature based on the private key corresponding to the public key transmitted to the second electronic device 400, and the subject which has provided the public key is ensured as the first electronic device 300. The second electronic device 400 may determine that the entire authentication process for the first electronic device 300 has completed and may finish the authentication (S555).

Figure 6:
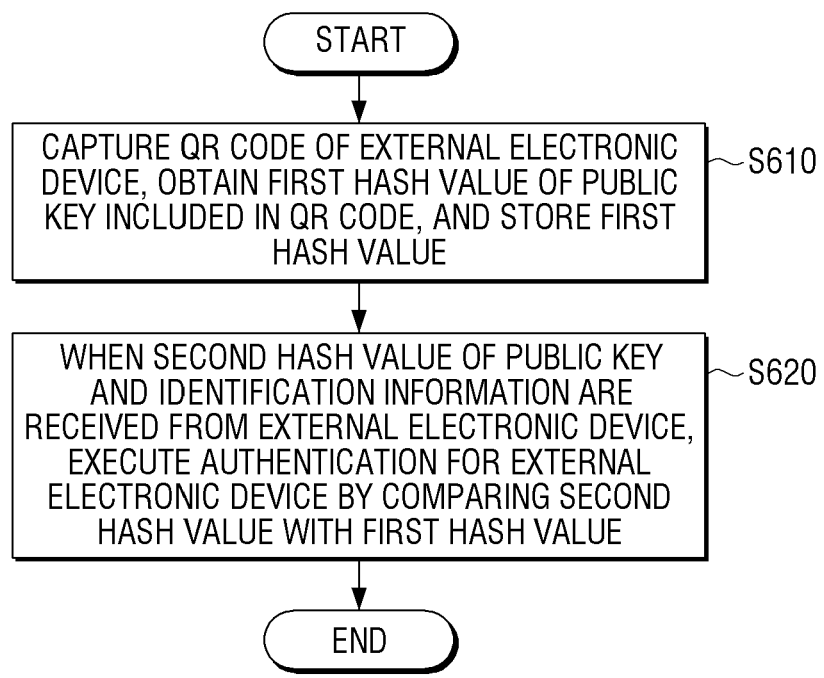
FIG. 6 is a flowchart for explaining a method for controlling the electronic device according to an embodiment.

FIG. 6 is a flowchart for explaining a method for controlling the electronic device according to an embodiment of the disclosure.

Referring to FIG. 6, the electronic device 100 may capture a QR code provided by the external electronic device 200 and obtain a first hash value of a public key included in the QR code. The electronic device 100 may store the obtained first hash value (S610).

When the second hash value of the public key and the identification information are received from the external electronic device 200, the electronic device 100 may execute the authentication for the external electronic device by comparing the second hash value with the first hash value.

The detailed description regarding specific operations of each step will be omitted since those have been described above.

Figure 7:
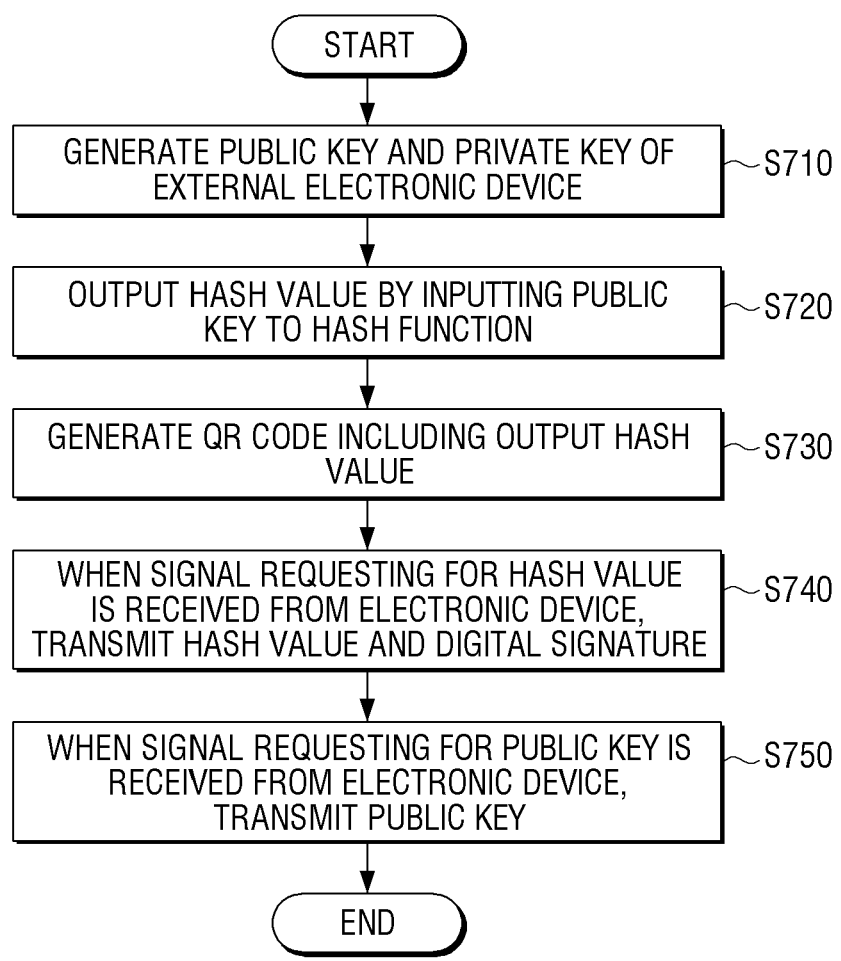
FIG. 7 is a flowchart for explaining a method for controlling the external electronic device according to an embodiment.

FIG. 7 is a flowchart for explaining a method for controlling the external electronic device according to an embodiment of the disclosure.

Referring to FIG. 7, the external electronic device 200 may generate a public key and a private key (S710). The external electronic device 200 may output a hash value by inputting the public key to the hash function (S720) and generate a QR code including the output hash value (S730).

When a signal requesting for a second hash value is received from the electronic device 100, the external electronic device 200 may transmit the second hash value and a digital signature (S740).

Then, when a signal for requesting the public key is received from the electronic device 100, the external electronic device 200 may transmit the public key to the electronic device 100 (S750).

The detailed description regarding specific operations of each step will be omitted since those have been described above.

At least some configurations of the methods according to the embodiments of the disclosure described above may be implemented in a form of an application installable in the existing electronic device.

In addition, at least some configurations of the methods according to the embodiments of the disclosure described above may be implemented simply by the software update or hardware update in the existing electronic device.

Further, at least some configurations in the embodiments of the disclosure described above may be executed through an embedded server prepared in the electronic device or an external server of the electronic device.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may execute one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
a camera;
a storage; and
a processor configured to:
  capture an image comprising authentication information of an external electronic device using the camera,
  obtain first information, a type of the first information is a hash value related to a public key included in the image,
  store the first information in the storage,
  request the external electronic device for second information, a type of the second information is a hash value,
  based on receiving second information related to the public key and identification information including a digital signature from the external electronic device,
  based on the first information matching with the second information, transmit a public key request signal to the external electronic device based on the identification information,
  based on receiving the public key from the external electronic device, compare the first information with third information output by inputting the received public key to a hash function,
  based on the third information matching with the first information, identify whether or not the digital signature is signed based on a private key corresponding to the public key received from the external electronic device, and
  based on identifying the digital signature as being signed based on the private key, finish authentication.

2. The device according to claim 1, wherein the image comprising the authentication information includes a QR code.

3. The device according to claim 1, wherein the type of the first information is at least one of a public key, a hash value related to the public key, a certificate comprising the public key, and
wherein the processor is configured to request the external electronic device for the second information which is the same type as the type of the first information based on the identification information.

4. The device according to claim 3, wherein the processor is configured to, based on the type of the first information being the hash value and the first information matching with the second information, transmit a public key request signal to the external electronic device based on the identification information.

5. The device according to claim 4, wherein the processor is configured to, based on the public key being received from the external electronic device, compare the first information with third information output by inputting the received public key to a hash function, and
based on the third information matching with the first information, execute authentication for the external electronic device.

6. The device according to claim 5, wherein the identification information comprises a digital signature, and
wherein the processor is configured to,
based on the third information matching with the first information, identify whether or not the digital signature is signed based on a private key corresponding to the public key received from the external electronic device, and
based on the digital signature being identified as being signed based on the private key, finish the authentication.

7. The device according to claim 3, wherein the processor is configured to, based on the type of the first information being the public key and the first information matching with the second information, transmit a certificate request signal to the external electronic device based on the identification information.

8. The device according to claim 7, wherein the processor is configured to, based on the certificate being received from the external electronic device, compare the received certificate with a certificate obtained based on the public key received from the image, and
based on the received certificate matching with the obtained certificate, finish the authentication.

9. The device according to claim 3, wherein the processor is configured to, based on the type of the first information being the certificate and the first information matching with the second information, transmit a certificate request signal to the external electronic device based on the identification information.

10. The device according to claim 9, wherein the processor is configured to, based on the certificate being received from the external electronic device, compare the received certificate with a certificate obtained from the image, and
based on the received certificate matching with the obtained certificate, finish the authentication.

11. A method for controlling an electronic device, the method comprising:
capturing an image comprising authentication information of an external electronic device;
obtaining first information, a type of the first information is a hash value related to a public key comprised in the image;
storing the first information;
requesting the external electronic device for second information, a type of the second information is a hash value;
based on receiving second information related to the public key and identification information including a digital signature from the external electronic device;
based on the first information matching with the second information, transmitting a public key request signal to the external electronic device based on the identification information;
based on receiving the public key from the external electronic device, comparing the first information with third information output by inputting the received public key to a hash function;
based on the third information matching with the first information, identifying whether or not the digital signature is signed based on a private key corresponding to the public key received from the external electronic device; and
based on identifying the digital signature as being signed based on the private key, finishing authentication.

12. The method according to claim 11, wherein the image comprising the authentication information includes a QR code.

13. The method according to claim 11, wherein the type of the first information is at least one of a public key, a hash value related to the public key, a certificate comprising the public key, and
wherein the method further comprises:
requesting the external electronic device for the second information which is the same type as the type of the first information.

14. The method according to claim 13, wherein the executing authentication comprises, based on the type of the first information being the hash value and the first information matching with the second information, transmitting a public key request signal to the external electronic device based on the identification information.

15. The method according to claim 14, wherein the executing authentication comprises, based on the public key being received from the external electronic device, comparing the first information with third information output by inputting the received public key to a hash function, and based on the third information matching with the first information, executing authentication for the external electronic device.

\* \* \* \* \*